US008223140B2

(12) United States Patent
Lee

(10) Patent No.: US 8,223,140 B2
(45) Date of Patent: Jul. 17, 2012

(54) ORGANIC ELECTROLUMINESCENT DISPLAY AND POWER SUPPLY DEVICE FOR THE SAME

(75) Inventor: Hyun-Jae Lee, Gumi-si (KR)

(73) Assignee: LG Display Co. Ltd., Seoul (KR)

( * ) Notice: Subject to any disclaimer, the term of this patent is extended or adjusted under 35 U.S.C. 154(b) by 249 days.

(21) Appl. No.: 12/564,430

(22) Filed: Sep. 22, 2009

(65) Prior Publication Data

US 2010/0156873 A1 Jun. 24, 2010

(30) Foreign Application Priority Data

Dec. 24, 2008 (KR) ........................ 10-2008-0133752

(51) Int. Cl.
*G06F 3/038* (2006.01)
*G09G 5/00* (2006.01)

(52) U.S. Cl. ........................................................ 345/211

(58) Field of Classification Search .................. 345/211, 345/31; 315/169.3, 291; 429/61
See application file for complete search history.

(56) References Cited

U.S. PATENT DOCUMENTS 5,559,402 A * 9/1996 Corrigan, III .............. 315/169.3
7,352,339 B2 * 4/2008 Morgan et al. .................. 345/31
7,397,068 B2 * 7/2008 Park et al. ........................ 257/88
7,557,519 B2 * 7/2009 Kranz ........................... 315/291
2007/0212596 A1 * 9/2007 Nebrigic et al. ................ 429/61
2009/0183763 A1 * 7/2009 Meyer ........................... 136/246

* cited by examiner

*Primary Examiner* — Fred Tzeng
(74) *Attorney, Agent, or Firm* — Brinks Hofer Gilson & Lione

(57) ABSTRACT

A power supply device for an organic electroluminescent display includes an inductor charging a first power source, a power supply unit including an input terminal and output terminals, the power supply unit receiving the first power source from the inductor through the input terminal, generating second power sources of different voltage levels, and outputting the second power sources through the output terminals, and a Schottky diode between the input terminal and one of the output terminals.

8 Claims, 5 Drawing Sheets

FIG. 6
voltage
15.0V
ND
0
voltage
inductor
0
time
time
S1
S2
S3

ORGANIC ELECTROLUMINESCENT DISPLAY AND POWER SUPPLY DEVICE FOR THE SAME

This application claims the benefit of Korea Patent Application No. 10-2008-0133752 filed on Dec. 24, 2008, the entire contents of which is incorporated herein by reference for all purposes as if fully set forth herein.

BACKGROUND

1. Field of the Invention

The present disclosure relates to an organic electroluminescent display, and more particularly, to an organic electroluminescent display and a power supply device for the same.

2. Discussion of the Related Art

Organic electroluminescent displays (OELDs) have been proposed and developed to solve some of the problems of liquid crystal display (LCD) devices in that they are not self-luminous. The OELDs are self-luminous display devices, which emit light by electrically exciting fluorescent organic compounds. The OELDs can be driven by low voltages and can be relatively thin. OELDs that include thin film transistors as a switching element in each pixel are referred to as active matrix OELDs (AMOELDs).

FIG. 1 is a view of a pixel structure of an organic electroluminescent display according to the related art, and FIG. 1 shows a pixel including two transistors and one capacitor.

In FIG. 1, the pixel includes a switching transistor SW, a capacitor C, a driving transistor DR and an organic light-emitting diode OLED on a substrate. The switching transistor SW and the driving transistor DR are NMOS (n-channel metal-oxide-semiconductor) transistors.

A gate electrode of the switching transistor SW is connected to a scan line S, and a source electrode of the switching transistor SW is connected to a data line D. One electrode of the capacitor C is connected to a drain electrode of the switching transistor SW, and the other electrode of the capacitor C is connected to a base voltage VSS, which may be ground potential. A gate electrode of the driving transistor DR is connected to the drain electrode of the switching transistor SW and the one electrode of the capacitor C, a source electrode of the driving transistor DR is connected to the base voltage VSS, and a drain electrode of the driving transistor DR is connected to a cathode electrode of the organic light-emitting diode OLED. An anode electrode of the organic light-emitting diode OLED is connected to a power supply line VDD providing driving voltages.

A driving method of the organic electroluminescent display having the pixel structure of FIG. 1 will be explained with reference to FIG. 2. FIG. 2 shows a timing chart of the organic electroluminescent display of FIG. 1.

The switching transistor SW turns ON by a positive selection voltage Vgh, which is supplied to an nth scan line S(n) (n is a natural number) from a gate driving integrated circuit (not shown), and the capacitor C is charged due to a data voltage Vdata supplied to the data line D. The data voltage Vdata is positive because the driving transistor DR has an n-type channel. Intensity of currents flowing through the channel of the driving transistor DR depends on potential difference between the data voltage Vdata stored in the capacitor C and the driving voltage VDD, and the organic light-emitting diode OLED emits light according to the intensity of the currents.

In the organic electroluminescent display, the analog voltage applied to the driving thin film transistor DR directly affects changes in the flow of currents of the organic light-emitting diode OLED for emitting light, and this is caused by alterations of various characteristics occurring in the driving thin film transistor DR.

Recently, to solve the problem, a digital driving method has been suggested, in which the intensity of currents of the organic light-emitting diode OLED for emitting light is controlled by adjusting the driving voltage VDD provided to the driving thin film transistor DR. To perform the digital driving method, an additional unit is required to supply voltages to RGB color pixels.

BRIEF SUMMARY

In one aspect, a power supply device for an organic electroluminescent display includes an inductor charging a first power source, a power supply unit including an input terminal and output terminals, the power supply unit receiving the first power source from the inductor through the input terminal, generating second power sources of different voltage levels, and outputting the second power sources through the output terminals, and a Schottky diode between the input terminal and one of the output terminals.

In another aspect, an organic electroluminescent display includes a display panel displaying images, a driving unit providing the display unit with driving signals, and a power supply device providing power sources to the driving unit, wherein the power supply device includes an inductor charging a first power source, a power supply unit including an input terminal and output terminals, the power supply unit receiving the first power source from the inductor through the input terminal, generating second power sources of different voltage levels, and outputting the second power sources through the output terminals, and a Schottky diode between the input terminal and one of the output terminals.

It is to be understood that both the foregoing general description and the following detailed description of the present invention are exemplary and explanatory and are intended to provide further explanation of the invention as claimed. Other systems, methods, features and advantages will be, or will become, apparent to one with skill in the art upon examination of the following figures and detailed description. Nothing in this section should be taken as a limitation on those claims. Further aspects and advantages are discussed below in conjunction with the embodiments. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The system and/or method may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views. The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to an embodiment of the present disclosure, an example of which is illustrated in the accompanying drawings.

An organic electroluminescent display includes a display panel for displaying images, a driving unit for providing the display unit with driving signals, and a power supply device for providing power sources to the driving unit. The display panel includes gate lines, data line, switching elements such as thin film transistors, and diodes.

Figure 1:
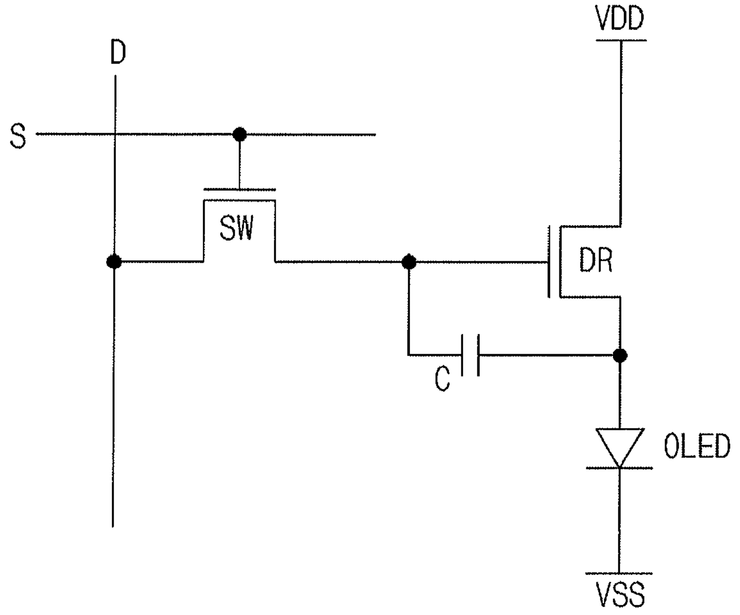
FIG. 1 RELATED ART
FIG. 1 is a view of a pixel structure of an organic electroluminescent display according to the related art.
Figure 2:
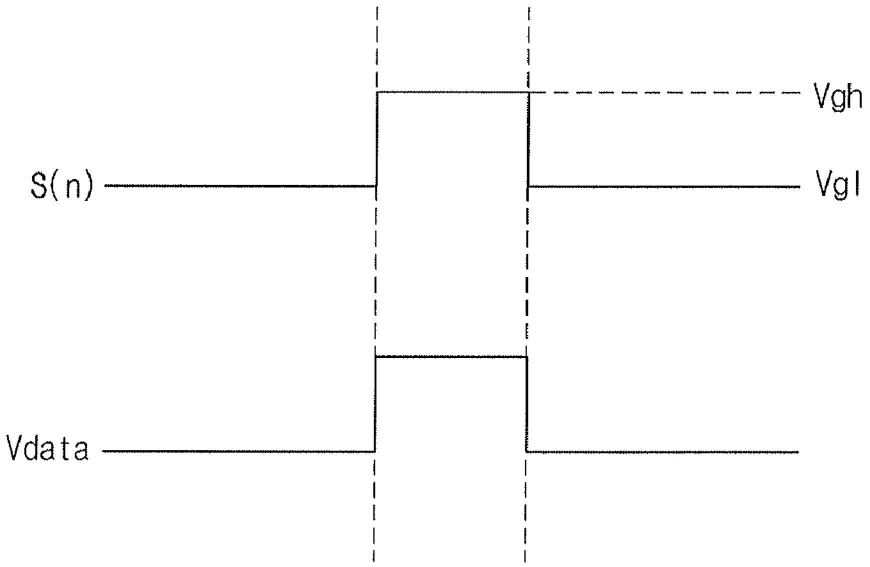
FIG. 2 RELATED ART
FIG. 2 is a timing chart of the organic electroluminescent display of FIG. 1.
Figure 3:
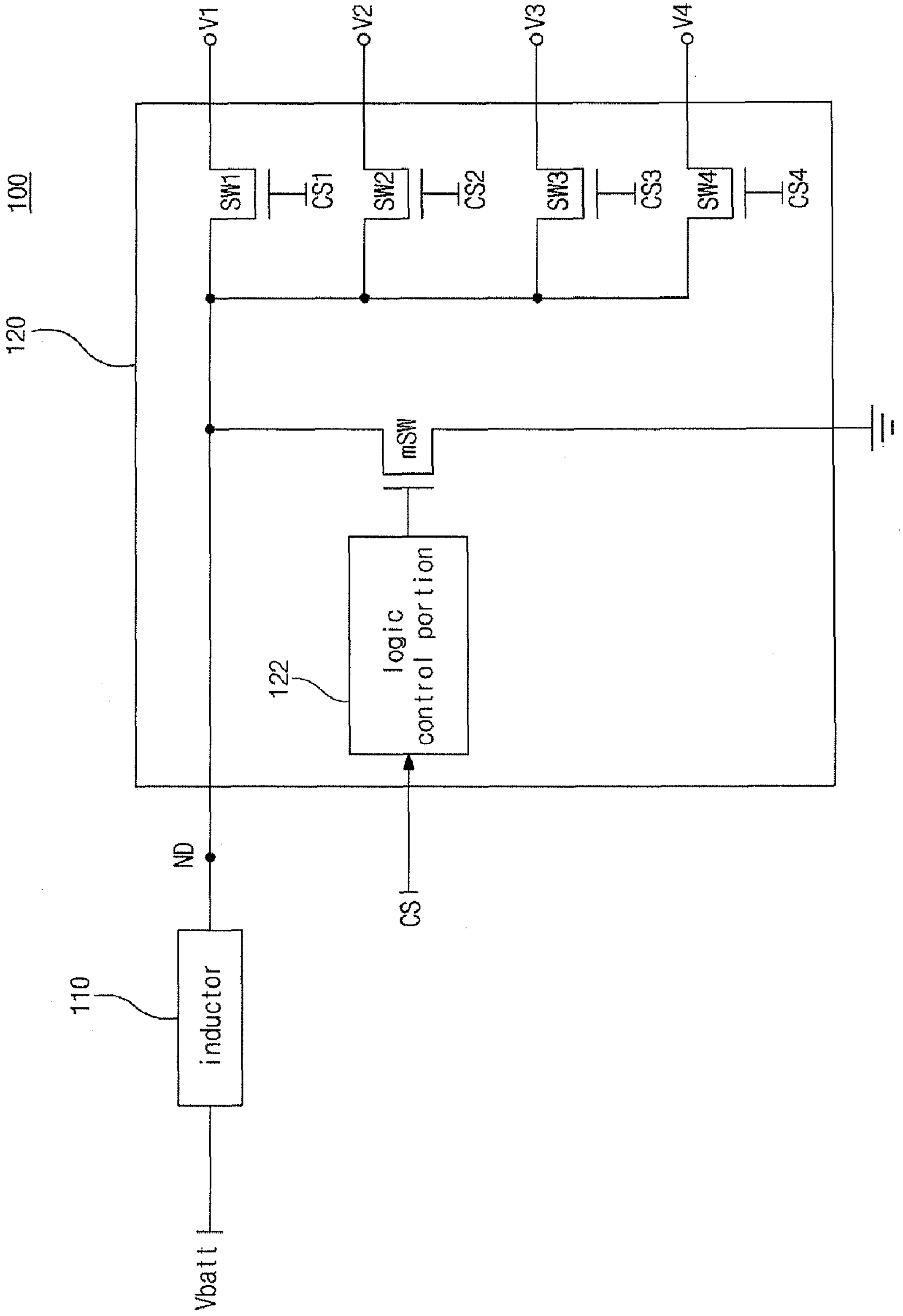
FIG. 3 is a schematic circuit diagram of a power supply device for an organic electroluminescent display according to an embodiment.

FIG. 3 is a schematic circuit diagram of a power supply device for an organic electroluminescent display according to an embodiment of the present invention.

In FIG. 3, the power supply device 100 includes an inductor 110 and a power supply unit 120.

The inductor 110 receives a first power source Vbatt from the outside, for example, from a battery, and charges it.

The power supply unit 120 outputs second power sources of first, second, third and fourth voltages V1, V2, V3 and V4 to output terminals according to operations of a main switch mSW, which is switched and controlled by a logic control portion 122. Here, the logic control portion 122 manages switching of the main switch mSW according to an outer control signal CS.

First, second, third and fourth switches SW1, SW2, SW3 and SW4 are schematic illustration of boost converter circuits, which transform the first power source Vbatt and then output the first, second, third and fourth voltages V1, V2, V3 and V4, respectively.

The first, second, third and fourth switches SW1, SW2, SW3 and SW4 corresponding to the boost converters can adjust levels of output voltages according to first, second, third and fourth control signals CS1, CS2, CS3 and CS4. The output voltages, that is, the first, second, third and fourth voltages V1, V2, V3 and V4 are provided for a gate driving signal and driving voltages VDD of the RGB color pixels. Here, generally, the first voltage V1 has the highest level among the output voltages.

By the way, the power supply device 100 may have a problem that peak voltages of high level instantaneously occur at a power supply node ND when the main switch mSW operates.

Figure 4:
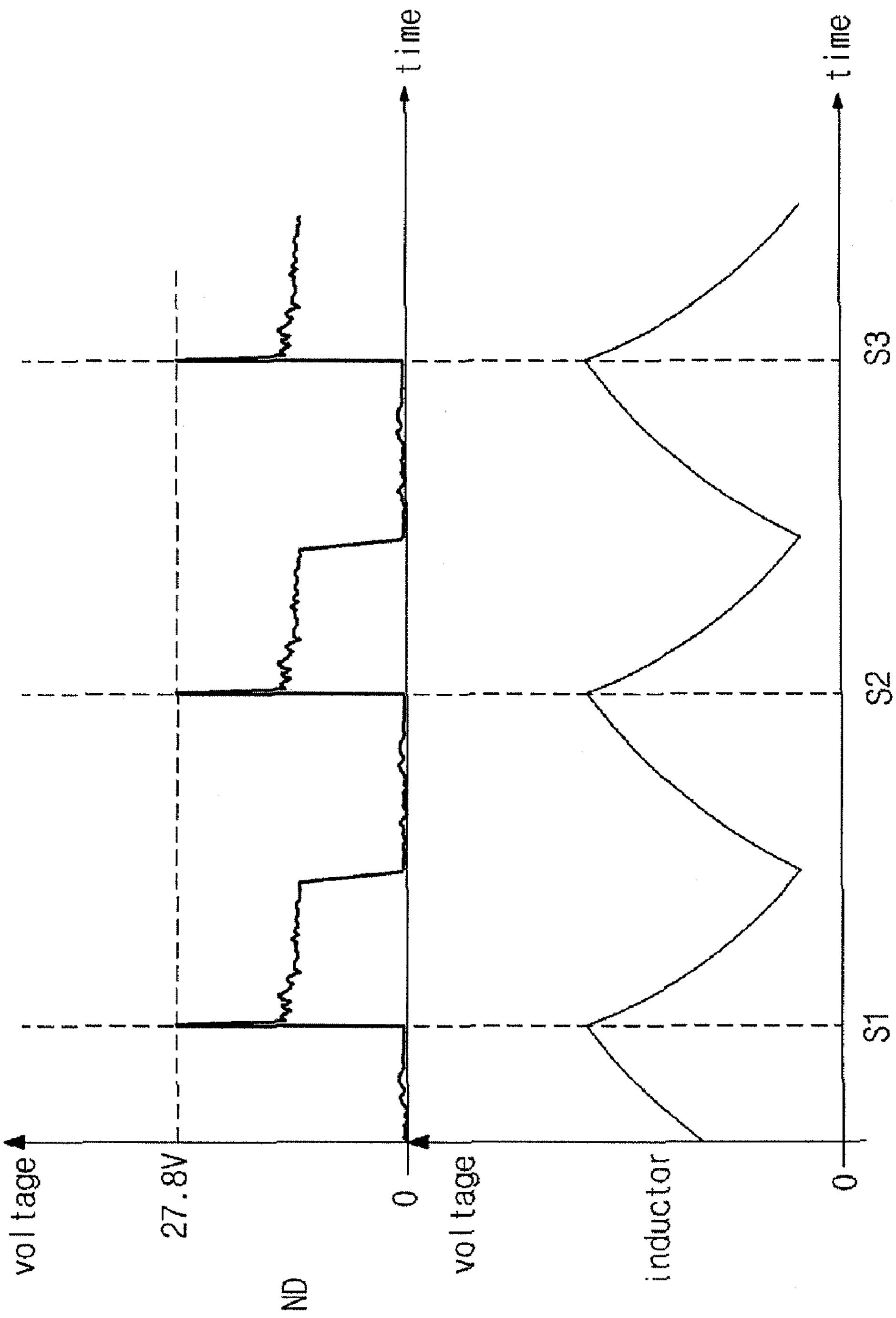
FIG. 4 is a signal waveform diagram of the power supply device of FIG. 3.

FIG. 4 is a signal waveform diagram of the power supply device of FIG. 3.

Referring to FIG. 3 and FIG. 4, at each of switching points S1, S2 and S3 when the main switch mSW is switched, the voltage charged in the inductor 110 is provided to the power supply unit 120 and has a decreasing voltage level. At this time, at each of the switching points S1, S2 and S3, a high voltage of more than about 27V occurs at the power supply node ND, which is an input terminal of the power supply unit 120.

The high peak voltage may occur from various sources. One is that electrical connection with a display panel is performed at the moment the main switch mSW is switched and the display panel functions as a load.

If the high peak voltage is larger than a withstanding voltage of the main switch mSW, for example, about 18V, the breakdown of the main switch mSW may be caused, and thus overcurrents may flow due to the breakdown. This may result in a fire.

Figure 5:
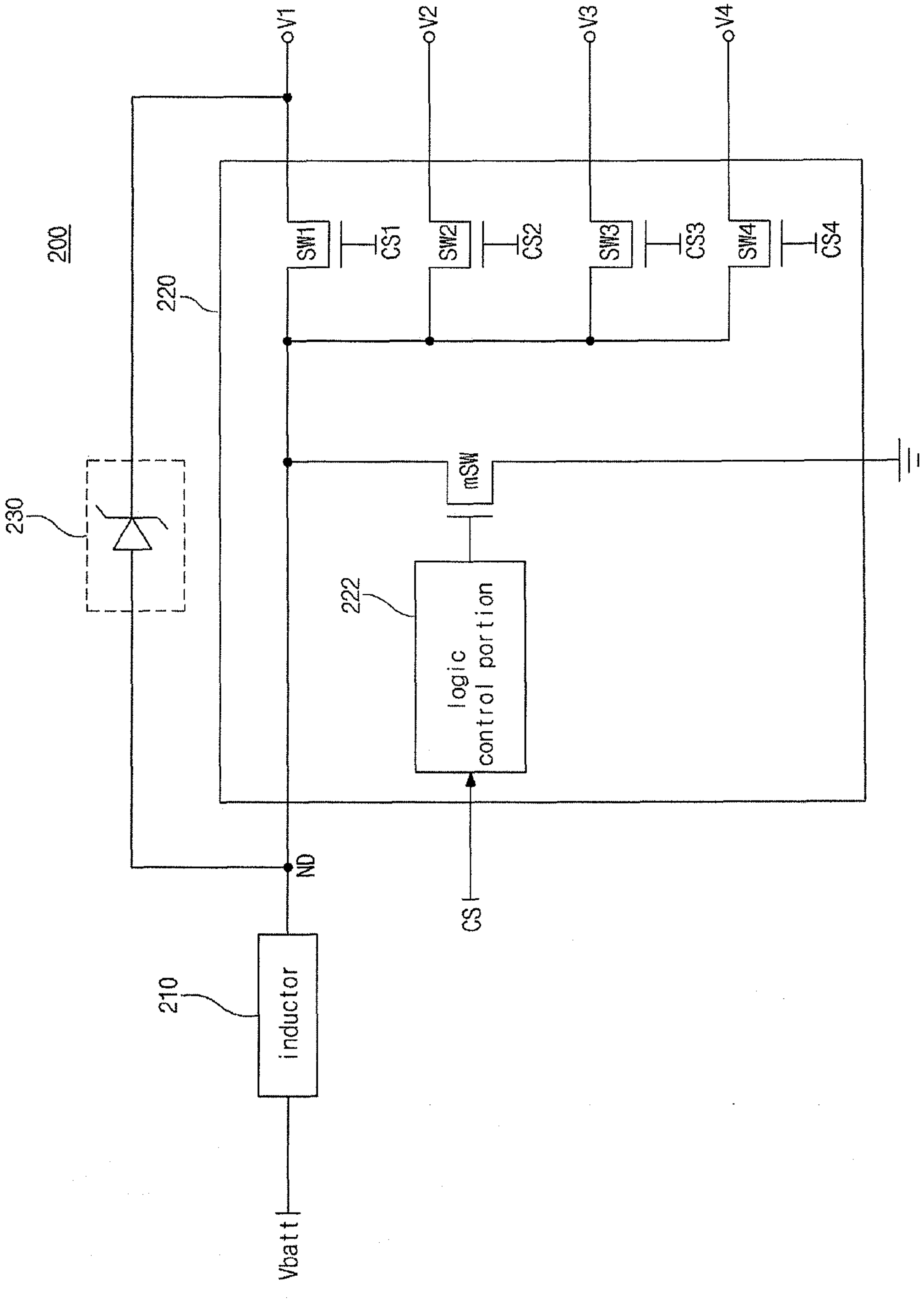
FIG. 5 is a schematic circuit diagram of a power supply device for an organic electroluminescent display according to another embodiment.

FIG. 5 is a schematic circuit diagram of a power supply device for an organic electroluminescent display according to another embodiment of the present invention.

In FIG. 5, the power supply device 200 includes an inductor 210, a power supply unit 220 and a Schottky diode 230.

The inductor 210 charges a first power source Vbatt provided from the outside, for example, from a battery, and provides the first power source Vbatt to the power supply unit 220.

The power supply unit 220 outputs second power sources corresponding to first, second, third and fourth voltages V1, V2, V3 and V4 to output terminals according to operation of a main switch mSW, which is switched and controlled by a logic control portion 222. Here, the logic control portion 222 manages switching of the main switch mSW according to an outer control signal CS.

The power supply unit 220 includes boost converter circuits for transforming the first power source Vbatt into voltages of different levels. First, second, third and fourth switches SW1, SW2, SW3 and SW4 are schematic illustration of a structure including the boost converter, which transform the first power source Vbatt and then output the first, second, third and fourth voltages V1, V2, V3 and V4, respectively.

The first, second, third and fourth switches SW1, SW2, SW3 and SW4 corresponding to the boost converters can adjust levels of output voltages according to first, second, third and fourth control signals CS1, CS2, CS3 and CS4. The first, second, third and fourth switches SW1, SW2, SW3 and SW4 may select the output terminals corresponding to the first, second, third and fourth voltages V1, V2, V3 and V4. The output voltages, that is, the first, second, third and fourth voltages V1, V2, V3 and V4 are provided for a gate driving signal and driving voltages VDD of the RGB color pixels, which are applied to gate lines and data lines of the display panel. Here, the first voltage V1 may have the highest level among the output voltages and beneficially may be used for generating the gate driving signal, which requires relatively high voltage level.

As stated above, the power supply device 200 includes the Schottky diode 230. An anode of the Schottky diode 230 is connected to a power supply node ND, which is an input terminal of the power supply unit 220, and a cathode of the Schottky diode 230 is connected to one of the output terminals for the second power sources V1 to V4, for example, the output terminal for the first voltage V1.

Like this, when the Schottky diode 230 is formed between the input terminal and the output terminal of the power supply device 200, the first power source Vbatt is limited to V1+0.2V due to characteristics of the Schottky diode 230. Accordingly, a peak voltage occurring at the power supply node ND is considerably restricted.

Figure 6:
FIG. 6 is a signal waveform diagram of the power supply device of FIG. 5.

FIG. 6 is a signal waveform diagram of the power supply device of FIG. 5.

Referring to FIG. 5 and FIG. 6, at each of switching points S1, S2 and S3 when the main switch mSW is switched, the voltage charged in the inductor 210 is provided to the power supply unit 220 and has a decreasing voltage level. At this time, at each of the switching points S1, S2 and S3, the peak voltage occurring at the power supply node ND, which is the input terminal of the power supply unit 120, is limited to about 15V due to the Schottky diode 230.

The peak voltage is lower than a withstanding voltage of the main switch mSW, and thus the main switch mSW is free from being breakdown. Therefore, the power source can be stably supplied, and a lifespan of the device can be extended. In addition, a fire, which can be caused by overcurrents resulting from the breakdown of the main switch mSW, can be prevented.

It will be apparent to those skilled in the art that various modifications and variations can be made in the present invention without departing from the spirit or scope of the invention. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. The above disclosed subject matter is to be considered illustrative, and not restrictive, and the appended claims are intended to cover all such modifications, enhancements, and other embodiments, which fall within the true spirit and scope of the present invention.

The invention claimed is:

1. A power supply device for an organic electroluminescent display, comprising:

an inductor charging a first power source;

a power supply unit including an input terminal and output terminals, the power supply unit receiving the first power source from the inductor through the input terminal, generating second power sources of different voltage levels, and outputting the second power sources through the output terminals; and a Schottky diode between the input terminal and one of the output terminals, wherein the second power sources include first, second, third and fourth voltages, and the first voltage has a higher level than the second, third and fourth voltages, and wherein the first voltage is provided for a gate driving signal of the organic electroluminescent display and the second, third and fourth voltages are provided for driving voltages of RGB color pixels of the organic electroluminescent display.

2. The device according to claim 1, wherein the power supply unit includes:

boost converters that transform the first power source into the second power sources;

a main switch that provides the first power source to the boost converters according to an outer control signal; and switches that select the output terminals corresponding to the second power sources.

3. The device according to claim 2, wherein the Schottky diode includes an anode connected to the input terminal.

4. The device according to claim 1, wherein the Schottky diode includes a cathode connected to the output terminal for outputting the first voltage.

5. An organic electroluminescent display, comprising:

a display panel that displays images;

a driving unit that provides the display unit with driving signals; and a power supply device that provides power sources to the driving unit, the power supply device including:

an inductor that charges a first power source;

a power supply unit including an input terminal and output terminals, the power supply unit receiving the first power source from the inductor through the input terminal, generating second power sources of different voltage levels, and outputting the second power sources through the output terminals; and a Schottky diode between the input terminal and one of the output terminals, wherein the second power sources include first, second, third and fourth voltages, and the first voltage has a higher level than the second, third and fourth voltages, and wherein the first voltage is provided for a gate driving signal which is applied to gate lines of the display panel and the second, third and fourth voltages are provided for driving voltages of RGB color pixels which are applied to data lines of the display panel.

6. The organic electroluminescent display according to claim 5, wherein the power supply unit includes:

boost converters that transform the first power source into the second power sources;

a main switch that provides the first power source to the boost converters according to an outer control signal; and switches that select the output terminals corresponding to the second power sources.

7. The device according to claim 6, wherein the Schottky diode includes an anode connected to the input terminal.

8. The device according to claim 5, wherein the Schottky diode includes a cathode connected to the output terminal for outputting the first voltage, which is provided for the gate driving signal applied to the gate lines of the display panel.

* * * * *